(12) United States Patent
Russ et al.

(10) Patent No.: US 11,270,548 B2
(45) Date of Patent: Mar. 8, 2022

(54) SYSTEMS EMPLOYING DIRECTIONAL SOUND RECORDINGS IN A CASINO ENVIRONMENT

(71) Applicant: IGT, Las Vegas, NV (US)

(72) Inventors: Michael Russ, Graz (AT); David Froy, Jr., Lakeville-Westmorland (CA); Stefan Keilwert, St. Josef (AT); Yue Hang Tang, Riverview (CA)

(73) Assignee: IGT, Las Vegas, NV (US)

( * ) Notice: Subject to any disclaimer, the term of this patent is extended or adjusted under 35 U.S.C. 154(b) by 25 days.

(21) Appl. No.: 16/692,608

(22) Filed: Nov. 22, 2019

(65) Prior Publication Data
US 2021/0158649 A1    May 27, 2021

(51) Int. Cl.
| | |
|---|---|
| *G07F 17/32* | (2006.01) |
| *G06F 21/64* | (2013.01) |
| *G07F 17/34* | (2006.01) |
| *G06F 21/51* | (2013.01) |

(52) U.S. Cl.
CPC .......... *G07F 17/3211* (2013.01); *G06F 21/51* (2013.01); *G06F 21/64* (2013.01); *G07F 17/34* (2013.01); *A63F 2300/6063* (2013.01); *G06F 2221/2109* (2013.01)

(58) Field of Classification Search
CPC .. G07F 17/3227; G07F 17/3211; G07F 17/34; G07F 17/3225; G07F 17/3206; G07F 17/3223; G07F 17/3237; G07F 17/3239; G07F 17/3216; G07F 17/3262; G07F 17/3272; G06F 21/51; G06F 21/64; G06F 3/167; A63F 9/24; A63F 13/25; A63F 13/54; A63F 2300/6063; H04S 2400/15; H04S 2420/01; H04S 7/301
See application file for complete search history.

(56) References Cited

U.S. PATENT DOCUMENTS

| | | | |
|---|---|---|---|
| 6,923,724 B2 | 8/2005 | Williams | |
| 7,465,230 B2 | 12/2008 | LeMay et al. | |
| 8,184,824 B2 * | 5/2012 | Hettinger | G07F 17/32 381/77 |
| 8,758,102 B2 | 6/2014 | Block et al. | |
| 9,536,390 B2 | 1/2017 | Ehrlich et al. | |
| 9,626,826 B2 | 4/2017 | Nguyen | |
| 9,927,244 B2 | 3/2018 | Nelson et al. | |
| 10,042,038 B1 * | 8/2018 | Lord | G10L 25/51 |
| 10,140,804 B2 | 11/2018 | Traphagen | |
| 2005/0051021 A1 * | 3/2005 | Laakso | G07F 17/32 84/615 |
| 2006/0058102 A1 * | 3/2006 | Nguyen | G07F 17/323 463/39 |

(Continued)

OTHER PUBLICATIONS

Fraunhofer upHear Spatial Audio Microphone Processing, retrieved from the Internet at https://www.iis.fraunhofer.de/en/ff/ammi/consumer-electronics/uphear-microphone.html, Dec. 19, 2019 (available before Nov. 22, 2019)(4 pages).

(Continued)

*Primary Examiner* — Justin L Myhr
(74) *Attorney, Agent, or Firm* — Neal, Gerber & Eisenberg LLP

(57) ABSTRACT

The present disclosure relates to systems employing directional sound recordings in a casino environment.

17 Claims, 10 Drawing Sheets

(56) References Cited

U.S. PATENT DOCUMENTS

| | | | |
|---|---|---|---|
| 2006/0217199 A1* | 9/2006 | Adcox | G07F 17/3223 463/40 |
| 2007/0275777 A1* | 11/2007 | Walker | G07F 17/3244 463/16 |
| 2008/0318655 A1 | 12/2008 | Davies | |
| 2010/0120494 A1* | 5/2010 | DeWaal | G07F 17/3227 463/20 |
| 2010/0323793 A1* | 12/2010 | Andall | A63F 13/54 463/35 |
| 2014/0328505 A1* | 11/2014 | Heinemann | G06F 3/017 381/303 |
| 2016/0093135 A1 | 3/2016 | Bond et al. | |
| 2016/0247348 A1 | 8/2016 | Nelson et al. | |
| 2017/0294072 A1* | 10/2017 | Achmuller | G07F 17/3206 |
| 2018/0053194 A1 | 2/2018 | Bond et al. | |
| 2018/0070143 A1* | 3/2018 | Joffe | G06F 16/738 |
| 2020/0286330 A1 | 9/2020 | Fu et al. | |

OTHER PUBLICATIONS

Soundskrit—Hear the Impossible, retrieved from the Internet at https://soundskrit.ca/, Dec. 19, 2019 (available before Nov. 22, 2019)(4 pages).

* cited by examiner

SYSTEMS EMPLOYING DIRECTIONAL SOUND RECORDINGS IN A CASINO ENVIRONMENT

BACKGROUND

The present disclosure relates to systems employing directional sound recordings in a casino environment.

Various electronic gaming machines may be operable to enable play of wagering games. Various electronic gaming machines may include one or more primary wagering games. Various electronic gaming machines may also include one or more secondary games. Various electronic gaming machines may produce sounds through one or more speakers in association with such games.

BRIEF SUMMARY

In various embodiments, the present disclosure provides an electronic gaming machine including a housing; a display device supported by the housing; a microphone supported by the housing; a sound producer supported by the housing; a processor; and a memory device that stores a plurality of instructions. The plurality of instructions, when executed by the processor, cause the processor to cause the display device to display a play of a game; receive an audio input from a player via the microphone; responsive to receiving the audio input, determine a position of the player based on a particle velocity of the audio input; and cause the sound producer to produce an audio output to the player based on the determined position of the player.

In various embodiments, the present disclosure provides an electronic gaming table including: a table structure configured to facilitate play of a game and including a plurality of different table positions; a microphone supported by the table structure; a sound producer supported by the table structure; a processor; and a memory device that stores a plurality of instructions. The plurality of instructions, when executed by het processor, cause the processor to: receive an audio input from a player via the microphone; responsive to receiving the audio input, determine one of the different table positions corresponding to the player based on a particle velocity of the audio input; and cause the sound producer to produce an audio output to the player based on the determined table position.

In various embodiments, the present disclosure provides a system operable in a casino environment including: a plurality of microphones; a plurality of sound producers; and a computing device. The computing device includes a processor and a memory device that stores a plurality of instructions. The plurality of instructions, when executed by the processor, cause the processor to: receive an audio input from a person in the casino environment via one of the plurality of microphones; responsive to receiving the audio input, determine a position of the person within the casino environment based on a particle velocity of the audio input; and cause one of the plurality of sound producers to produce an audio output to the person based on the determined position of the person within the casino environment.

Additional features and advantages are described in, and will be apparent from, the following Detailed Description and the Figures.

DETAILED DESCRIPTION

Figure 1:
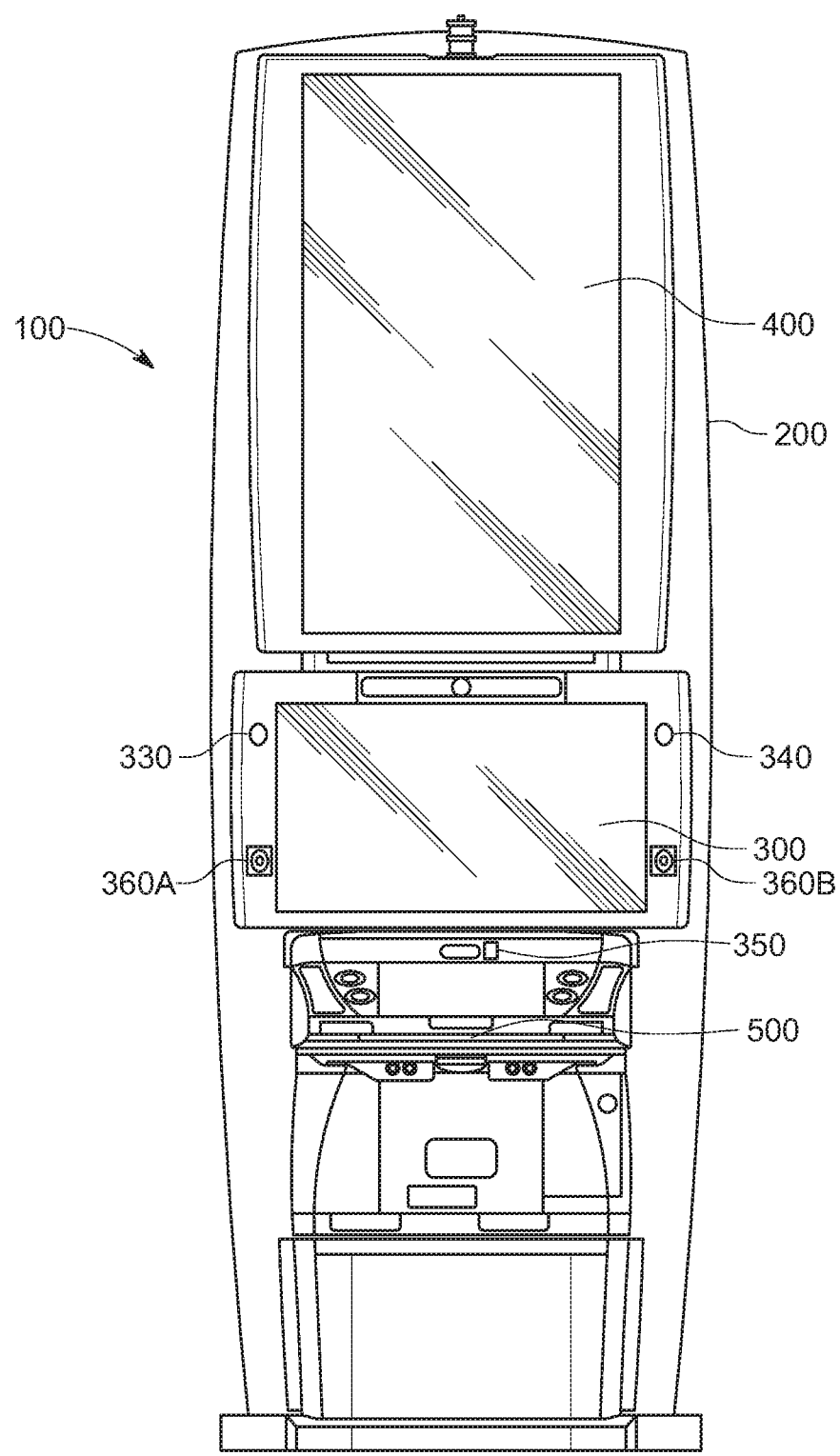
FIG. 1 is a front view of one example embodiment of an electronic gaming machine ("EGM") of the present disclosure.

The present disclosure relates to systems employing directional sound recordings in a casino environment, and more specifically to electronic gaming systems, electronic gaming machines, tables, and other systems operable in casino environments in which directional sound(s) is/are captured and employed for various purposes such as the example purposes described herein. It should be appreciated that the example sounds and example purposes described herein are not meant to limit the present disclosure.

In various embodiments, the present disclosure provides new electronic gaming systems and methods of operating such new electronic gaming systems. For brevity and clarity, and unless specifically stated otherwise, the term "EGM" is used herein to refer to an electronic gaming machine (such as but not limited to a slot machine, a video poker machine, a video card machine, a video lottery terminal (VLT), a sports betting terminal, a video keno machine, or a video bingo machine).

Various embodiments of the present disclosure provide also new gaming tables and methods of operating such new gaming tables.

Various embodiments of the present disclosure provide a new gaming environment that includes one or more microphones and speakers, EGMs, and/or gaming tables, such as the new EGMs and new gaming tables of the present disclosure.

I. Example EGMS

Referring now to FIGS. 1, 2A, 2B, and 3, one example EGM of the present disclosure is generally illustrated and indicated by numeral 100. This example EGM 100 illustrated in FIGS. 1, 2A, 2B, and 3 generally includes a housing 200 (sometimes referred to herein as a "support structure" or a "cabinet") having a front side that supports a plurality output devices and a plurality of input devices of the EGM 100, among other components. In this example embodiment, the EGM 100 includes: (a) a first or intermediate display device 300 supported by the housing 200; (b) a microphone 350 supported by the housing 200; (c) a first speaker 360A supported by the housing 200; (c) a second speaker 360B supported by the housing 200 and spaced apart from the first speaker 360A; and (e) a processor (not shown) and a memory device (not shown) that co-act or work together with the above-mentioned components to receive audio input via the microphone 350 and provide audio output via the speakers 360A and 360B. In this example embodiment, the first speaker 360A and the second speaker 360B are respectively positioned in a stereo configuration with respect to multiple different positions at which a player can be seated in front of the housing 200. As described in more detail below, the speakers 360A and 360B may output directional sound beams (e.g., at the respective ears of the player).

In this example embodiment, the first or intermediate display device 300, the microphone 350, the first speaker 360A, the second speaker 360B, the processor, and the memory device are configured to receive audio input and produce and output sound beams by operating in real-time or substantially real-time basis to: (a) determine the location and orientation of a player interacting with the EGM; (b) determine the location and orientation of multiple players interacting with the EGM; (c) determine the location and orientation of one or more bystanders nearby the EGM; (d) trigger various EGM actions based on the determined position(s) of the player(s) and bystanders; and/or (e) enable interaction with the EGM by the player(s) and bystander(s), such as the functions disclosed in more detail below. It should be appreciated that the processor and the memory device may be configured to operate with one or more sound cards (not shown) to cause the microphone 350 to receive audio input, and to cause the production and output of sound beams by the speakers 360A and 360B. In some embodiments, the processor and/or the memory device is integrated with the one or more sound cards. In some embodiments, the one or more sound cards are integrated with the microphone 350, first speaker 360A and/or the second speaker 360B.

In the example embodiment shown in the Figures, the microphone 350 is a directional microphone. The microphone 350 is configured to sense and measure the particle velocity of sound(s) (i.e., the flow). In some example embodiments, the microphone may be configured to measure the particle velocity of sound instead of the pressure. In various embodiments, the microphone 350 includes multiple components stacked together in an orientation that enables the direction of incoming sound(s) to be determined. This enables sounds from multiple directions to be separated and distinguished from each other.

In certain example embodiments, processing of the data output by the microphone 350 can include spatial audio processing. Spatial audio processing includes performing sound localization on a sound source, to determine the direction, distance, and other characteristics of the sound source. Examples provided herein enable spatial audio processing without the need for complex or expensive microphone arrays. This is due to the processing algorithms used in connection with the directional microphone 350, specifically by analyzing the particle velocity data captured by the microphone.

It should be appreciated that: (a) the first or intermediate display device 300; (b) the microphone 350; (c) the first speaker 360A; and/or (d) the second speaker 360B, may each be individually configured or may alternatively be configured to operate with the processor and the memory device to provide each of their designated functions described herein. In other words: (a) the first or intermediate display device 300 may be individually configured to display images (e.g., 2D and/or 3D images) or may be configured to operate with the processor and the memory device to display images; (b) the microphone may be individually configured to receive and process audio inputs, or may be configured to operate with the processor and the memory device to receive and process audio inputs; (c) the first speaker 360A may be individually configured to output a first sound beam or may be configured to operate with the processor and the memory device to output the first sound beam; and/or (d) the second speaker 360B may be individually configured to output a second sound beam or may be configured to operate with the processor and the memory device to output the second sound beam. Thus, for purposes of this disclosure and for brevity, each of these devices are sometimes discussed as performing such tasks individually or operating with the processor and the memory device to perform such tasks, and such descriptions are not intended to limit the present disclosure to either configuration.

In this illustrated example embodiment, the plurality of visual output devices includes: (a) the first or intermediate display device 300; (b) a second or upper display device 400 positioned above the first or intermediate display device 300; and (c) a third or lower display device 500 positioned below the first or intermediate display device 300. These visual output devices 300, 400, and 500 are configured to display the game(s), game outcome(s), award(s) (such as the primary and/or secondary game award(s) or other game outcome award(s)), and/or other functionality and information to the player.

In this illustrated example embodiment, the plurality of player input devices enable the player to play one or more wager games provided by the EGM 100. Such player input devices can also include one or more input devices described below in the fourth (IV) section of this detailed description. These player input devices are physically touchable or activatable by the player to enable the player to make inputs into the EGM 100. It should be appreciated that in certain embodiments, the player input devices are non-touch inputs, such as head trackers, eye gaze monitors, microphones, etc.

These output and input devices are configured such that a player may operate the EGM 100 while standing or sitting, but preferably operates with the EGM 100 while the player is sitting in front of the EGM 100 such that the player's head is approximately at the same height as the first display device 300.

Referring now to FIGS. 1, 2A, 2B, and 3, various examples of how the EGM can function are provided. It should be appreciated that the present disclosure is not limited to these examples.

Figure 2A:
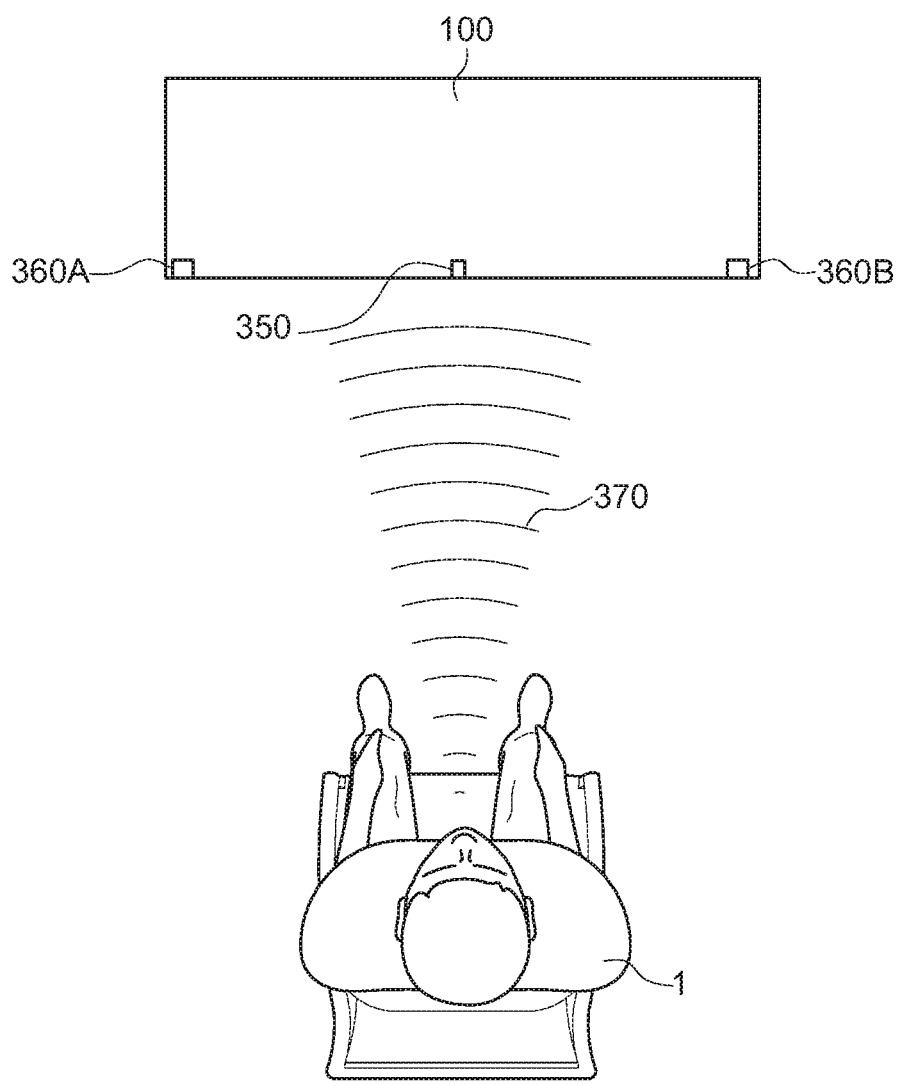
FIG. 2A is a top perspective view of the EGM of FIG. 1 and a player sitting on a chair in front of the EGM.
Figure 2B:
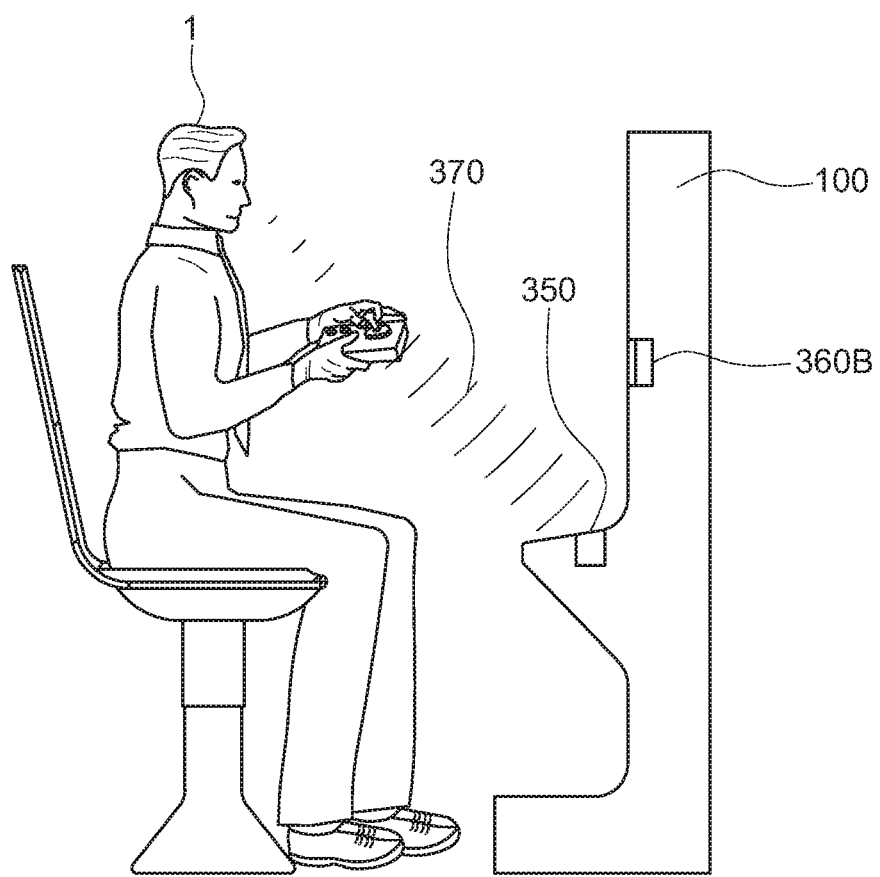
FIG. 2B is a side perspective view of the EGM of FIG. 1 and a player sitting on a chair in front of the EGM.

FIGS. 1, 2A, and 2B illustrate one example operation of an EGM 100 of one embodiment of the present disclosure. FIG. 1 shows the EGM 100 including the various components described herein. FIGS. 2A and 2B show the EGM 100 and a player from a front view and a top view respectively.

As shown, the EGM 100 includes: (a) the housing 200; (b) a display device supported by the housing, such as display device 300; (c) a microphone 350 supported by the housing; (d) a sound producer supported by the housing, such as speakers 360A and 360B; (e) a processor (not shown); and (f) a memory device that stores a plurality of instructions. The plurality of instructions, when executed by the processor, cause the processor to: (i) cause the display device to display a play of a game; (ii) receive an audio input 370 from the player 1 via the microphone 350; (iii) responsive to receiving the audio input 370, determine a position of the player 1 based on a particle velocity of the audio input 370;

and (iv) cause the sound producer (e.g., speakers 360A and 360B) to produce an audio output to the player based on the determined position of the player.

In certain example embodiments, the EGM includes multiple directional microphones supported by the housing. The multiple directional microphones may be positioned adjacent to each other, or may be positioned at various locations in and around the housing 200. In certain example embodiments, the microphones are communicatively connected to a server, processor, controller, or other computing device to process the signal received by the microphones. This enables the microphones to be used to detect players, bystanders, and other sources of sounds nearby the EGM. The received audio signal(s) can then be used to trigger one or more actions, such as outputting a particular audio signal, adjusting a direction of an output audio signal, and more. These actions are discussed in further detail below.

In certain example embodiments, the microphone 350 receives an input audio from the player 1, and in response, determines or assists in determining a position of the player 1 with respect to the EGM 100. The position of the player 1 can include the head position (e.g., using a 3D coordinate system to determine the left-right, up-down, and front-back positioning of the player's head), determined based on the input audio signal. During operation of the EGM 100, there may be a preferred or optimal head positioning with respect to the EGM 100 that provides the best experience for the player, in terms of optimal lighting, acoustics, and more. Based on the determined position of the player, the EGM can cause the sound producer (e.g., speakers 360A and/or 360B) to output a suggestion to the player to adjust the position of the player. This can include a suggestion to move the seat closer or farther away, raise or lower the seat, or make some other change that will bring the player position into the preferred or optimal position.

In certain example embodiments, based on the determined player position the EGM 100 may adjust a beaming direction of the output from the sound producers 360A and 360B. The adjustment may be made such that the output audio is beamed directly to the head or ears of the player 1. In certain example embodiments, the adjustment of the output audio beaming direction may be dynamic, such that it changes over time as further information is gathered about the player position, or as the player position changes over time (e.g., by the player 1 moving closer or further from the EGM 100, or adjusting the seat height). In certain example embodiments, a feedback control system is implemented to adjust such vertical/horizontal distance automatically to maximize the loudness of the directional microphones received at the player's ears, and maintaining the optimal distance between the player 1 and the EGM 100.

In certain example embodiments, the EGM 100 may use multiple directional microphones to improve the accuracy of the determination of the player position. Furthermore, the EGM 100 may use a determined volume of the input audio to estimate or increase the accuracy of the player position determination.

In certain example embodiments, the EGM 100 can determine a player head orientation corresponding to the player 1. The player head orientation can include a direction that the player's head is facing (e.g., toward the display device 300, to the left of the display device 300, etc.). The player head orientation can be determined based on the input audio from the player. For example, if a microphone positioned on a first side of the EGM 100 detects an increased volume while a corresponding microphone on the second side of the EGM detects a decreased volume, while the position of the player has not changed, that may indicate that the direction of the player's head is facing the first side of the EGM 100. Upon determining that the player head orientation is directed away from the EGM 100, or the display device 300 of the EGM 100, the EGM 100 can cause the sound producer (e.g., speakers 360A and/or 360B) to output a distracted player audio output to the player. The distracted player audio output can include a suggestion to return to viewing the display device 300. Alternatively, the distracted player audio output may be a sound that indicates that the game displayed by the EGM is still active, has been paused, or some other action has been taken in response to the player 1 no longer paying attention.

Figure 3:
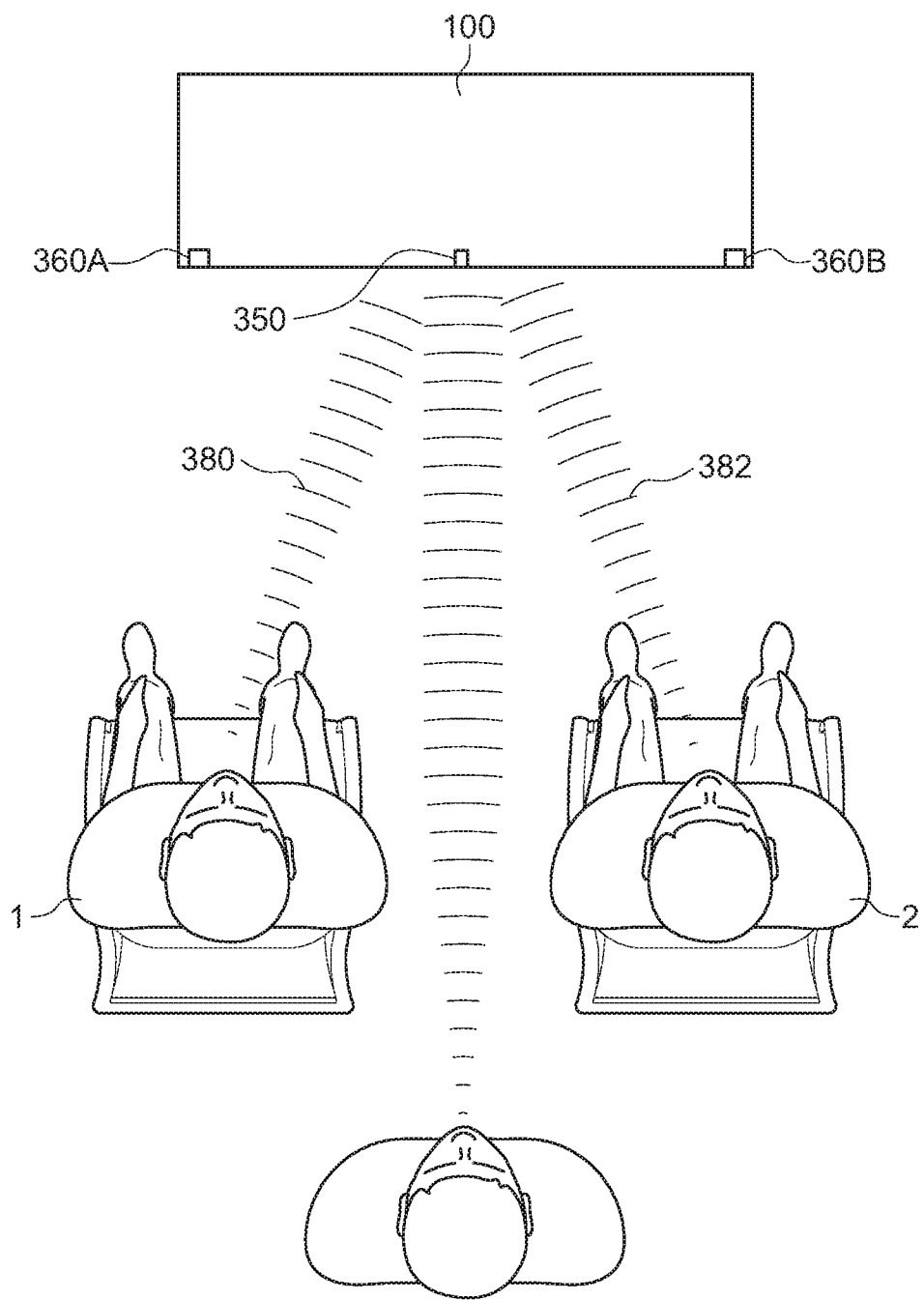
FIG. 3 is a top perspective view of the EGM of FIG. 1, along with first and second players sitting on chairs in front of the EGM and a bystander standing behind the players.

FIG. 3 illustrates an example in which two players (e.g., player 1 and player 2) are both present and interacting with the EGM 100. Each of the functions described above (e.g., receiving input audio, determining player position, determining player head position, providing output audio based on player position, automatically adjusting speaker output direction, etc.) can be performed for each of player 1 and player 2 separately.

In certain example embodiments, the microphone 350 receives a first audio input 380 from the first player 1, and receives a second audio input 382 from the second player 2. The EGM 100 can determine the first position of the first player 1 based on the first audio input 380, and can determine the second position of the second player 2 based on the second audio input 382. In either or both cases, the microphone 350 can detect a particle velocity corresponding to the audio inputs 380 and 382. The EGM 100 can separate or distinguish the first audio input 380 from the second audio input 382. And in response, the EGM 100 can associate the first audio input 380 and the first player position with the first player 1, and can associate the second audio input 382 and the second player position with the second player 2. In some examples, the EGM 100 can provide a first audio output to the first player 1, and a second audio output to the second player 2. The first and second audio outputs can be produced by the audio producer (e.g., speakers 360A and 360B), and can be directed toward the player 1 and player 2 respectively. The audio output direction can be adjusted based on the determined first position of the first player 1 and the determined second position of the second player 2.

In certain example embodiments, the EGM 100 can differentiate between the first player 1 and the second player 2, and provide personalized audio output to each player. For example, audio inputs from the first player 1 and/or the second player 2 can trigger personalized actions, such as tailing output audio using each player's name, offering a suggestion of a game to play based on a gaming history of the player, and more.

In certain example embodiments, for a first player and a second player, the EGM 100 may provide a game that includes simultaneous or near simultaneous control by both players. For example, the game can include a karaoke element, in which each player is scored separately based on his or her performance during a duet. Other games can also include simultaneous or near simultaneous control by both players. In these cases, the EGM 100 may receive the first audio input 380 from the first player 1 and receive the second audio input 382 from the second player 2. In response, the EGM 100 may enable control of the game by both the first player 1 and the second player 2, based on their corresponding audio inputs. Each player can independently control the game, or at least their portion of the game, via their corresponding audio input. In this manner, the first player 1 and the second player 2 can each participate in the game and control various functions of the game, at the same time as each other, using their respective voices. In order to enable control by both the first player 1 and the second player 2, the EGM 100 may include multiple microphones, to enable more targeted and directional reception of audio inputs.

FIG. 3 also illustrates an example wherein a bystander 3 is positioned nearby the EGM 100. The bystander 3 may be a person who is nearby the EGM 100, but not actively participating in the game. The EGM 100 can receive a third audio input 384 from the bystander 3. The EGM 100 can then associate the third audio input 384 with the bystander 3, and determine a third position of the bystander 3. In one example, the EGM 100 can receive the third audio input 384, and determine a third position of the bystander 3 based on the particle velocity of the received third audio input 384. Based on the determined third position, the EGM 100 can determine that the bystander is not positioned in a player position (e.g., in a chair positioned in front of the EGM 100), and thus is not a player or participant in the game. Alternatively, the EGM 100 can determine that the bystander is not a participant in the game based on a distance between the EGM and the determined bystander position.

In certain example embodiments, the EGM 100 can then produce a third audio output to the bystander 3, based on the third audio input 384 and the determined position of the bystander. For instance, the third audio output can include a suggestion of a game for the bystander to play. This suggestion can be based on the content of the third audio input 384. Where the bystander 3 expresses interest in the game being played on the EGM 100, the EGM 100 may suggest a nearby unoccupied EGM that includes the same game, so that the bystander 3 can play as well.

In certain example embodiments, the EGM 100 can detect a quantity of players and bystanders present nearby. The EGM 100 can then provide a suggestion of a gaming experience based on the determined quantity.

II. Gaming Table

Figure 4:
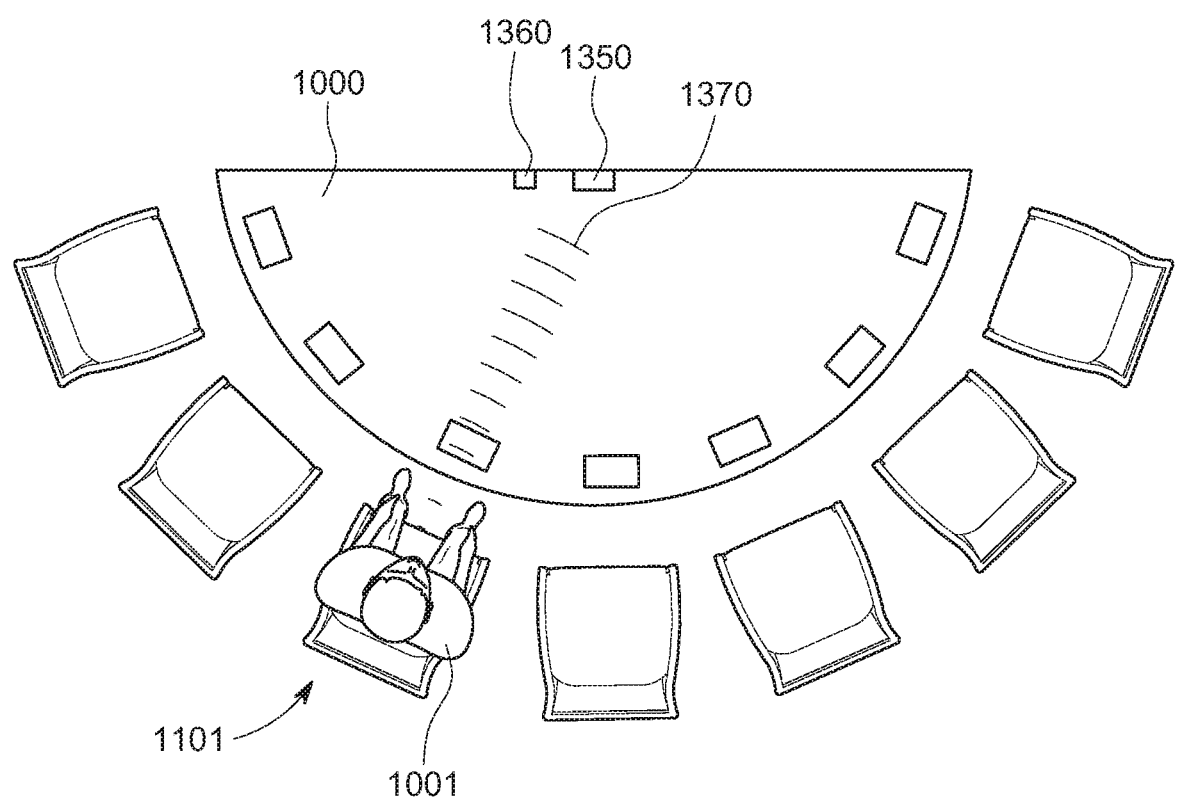
FIG. 4 is a top perspective view of one example embodiment of a gaming table of the present disclosure, and a player sitting on a chair at the gaming table.
Figure 5:
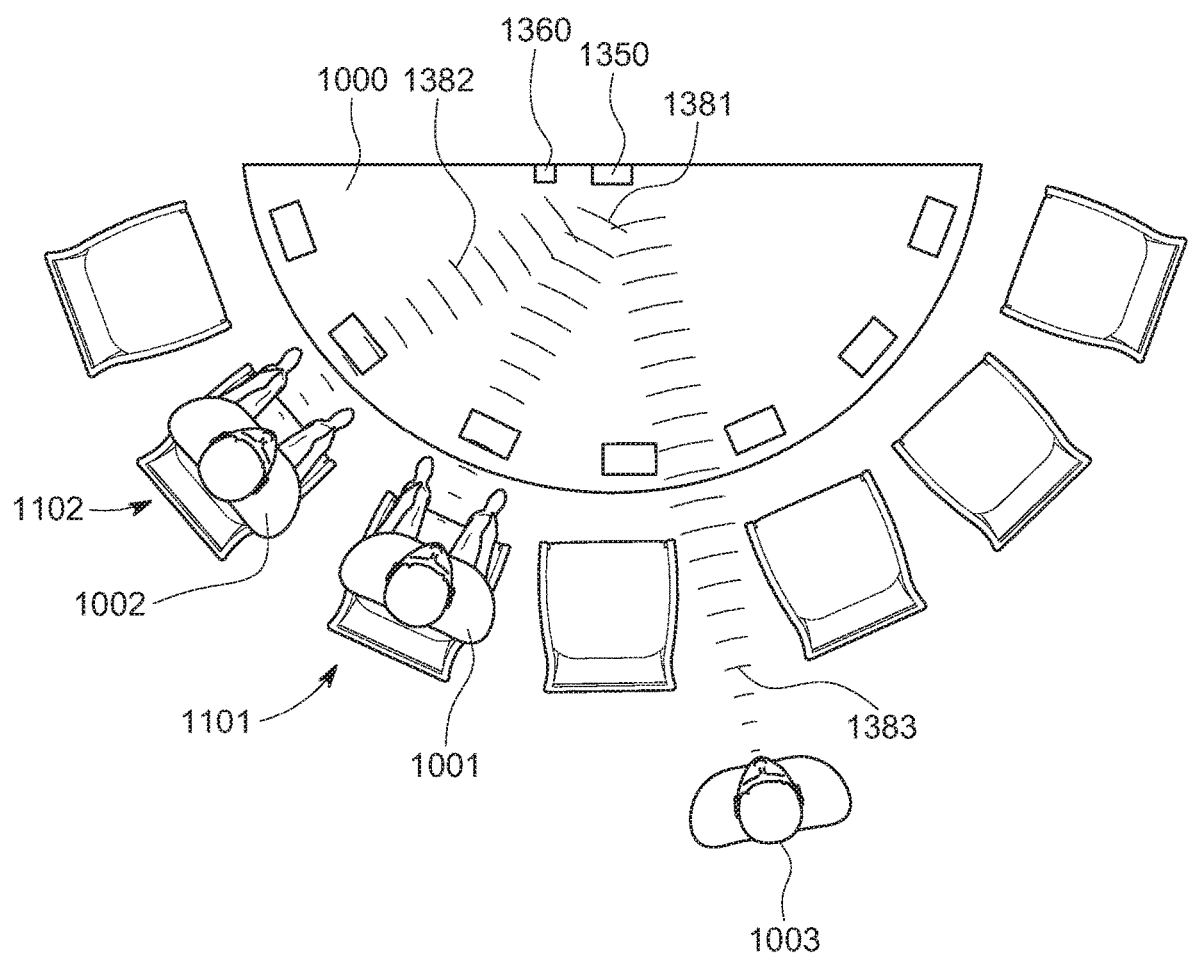
FIG. 5 is a top perspective view of the gaming table of FIG. 4, along with first and second players sitting on chairs at the gaming table and a bystander standing adjacent to the gaming table (behind two of the empty chairs at the gaming table).

FIGS. 4 and 5 illustrate another embodiment of the present disclosure including an electronic gaming table 1000. The gaming table 1000 can include one or more features that are similar or identical to those described above with respect to the EGM 100, and below with respect to section (IV). It should be appreciated that one or more of the features disclosed with respect to the EGMs herein can also apply to the gaming tables disclosed herein. For example, the gaming table 1000 can include a microphone 1350, a sound producer 1360, a memory (not shown), and a processor (not shown). The microphone 1350, sound producer 1360, memory, and processor may be integrated with and/or supported by the gaming table 1000 (i.e., supported by the table structure of the gaming table 1000). Alternatively, one or more of these components may be associated with the gaming table 1000, but not directly supported by or connected to the gaming table 1000. One or more components may be positioned nearby, and directed toward one or more table positions (i.e., microphones directed toward the table positions). The microphone 1350, sound producer 1360, memory, and processor of the gaming table 1000 may function similarly or identically to the microphone 350, sound producer (e.g., speakers 360A and 360B), processor, and memory of the EGM 100.

Gaming table 1000 also includes a table structure, configured to facilitate play of a game, and including a plurality of different table positions. For example, the gaming table 1000 may be a blackjack table including seven table positions for players. Each table position may have a corresponding chair, display, controls, and more, depending on the type of gaming table. In some examples, the gaming table 1000 may be configured to facilitate game play with a human dealer. Alternatively, the gaming table 1000 may be configured to facilitate gameplay by an electronic dealer.

FIG. 4 illustrates a first player 1001 positioned at a first table position 1101. The microphone 1350 is configured to receive a first audio input 1370. Responsive to receiving the first audio input 1370, the gaming table 1000 is configured to determine one of the different table positions corresponding to the player 1001 based on a particle velocity of the first audio input 1370. Then, based on the determined table position, the gaming table 1000 is configured to cause the sound producer 1360 to produce a first audio output to the player 1001. In the example shown in FIG. 4, the first audio output produced by the sound producer 1360 is directed toward the first player 1001 positioned at the first table position 1101. If instead it were determined that the first player 1001 was positioned at a different table position, the first audio output would instead be directed toward that different table position.

In certain example embodiments, the gaming table 1000 is configured to determine a player head position based on the first audio input 1370. This can include determining a head height, distance, and orientation with respect to the gaming table 1000. Based on the determined head position, the gaming table 1000 can cause the sound producer 1360 to produce the first audio output to the player 1001 directed at the player head position. In further example embodiments, the determined player head position can be used to determine whether the player head position is optimally located for visual and acoustic purposes. Where the player head position is not within an optimal range or position, the gaming table 1000 may provide an alert or suggestion to the player 1001 to adjust his or her position to enter the optimal position.

In certain example embodiments, the gaming table 1000 can include a single microphone 1350. In other example embodiments, the gaming table can include a plurality of microphones. The plurality of microphones can be located adjacent to each other, or may be positioned separated from each other at various points with respect to the gaming table 1000. Similarly, the gaming table can include a single sound producer 1360, or may include a plurality of sound producers. The plurality of sound producers can be located adjacent to each other, or may be positioned separated from each other at various points with respect to the gaming table 1000.

In certain example embodiments, one or more of the microphones and/or sound producers can be communicatively coupled to a server, processor, and/or controller that enables the input audio to be processed and analyzed. Further, the server, processor, and/or controller may be coupled to or supported by the gaming table 1000, or may be separate from and not physically connected to the gaming table 1000.

Similar to the EGM 100 discussed above, the volume of the first audio input 1370 can be used to estimate and determine a distance between the head of the player 1001 and the microphone 1350. This information can be used to assist in the determination of the table position, player had position, and other positioning information corresponding to the player 1001.

FIG. 5 illustrates an example in which a first player 1001 is positioned at a first table position 1101, a second player 1002 is positioned at a second table position 1102, and a bystander 1003 is positioned nearby the gaming table 1000. The gaming table 1000, via the microphone 1350, is configured to receive the first audio input 1381 from the first player 1001. The gaming table 1000 is then configured to associate the first audio input 1381 with the first player 1001, and determine the table position 1101 corresponding to the first player 1001 based on the particle velocity of the first audio input 1381. The gaming table 1000 is also configured to receive a second audio input 1382 from the second player 1002. The gaming table 1000 is then configured to associate the second audio input 1382 with the second player 1002, and determine the table position 1102 corresponding to the second player 1002 based on the particle velocity of the second audio input 1382.

The gaming table 1000 may then be configured to cause the sound producer 1360 to produce a first audio output to the first player 1001 based on the determined first table position 1101, and produce a second audio output to the second player 1002 based on the determined second table position 1102.

In certain example embodiments, the gaming table 1000 may use positional information about the first player 1001 and/or second player 1002 to automatically adjust a direction of the output of the sound producer 1360. For example, this can include compensating for the distance from the player to the microphone 1350 and/or sound producer 1360, compensating for the height of the player (e.g., based on the determined player head position), and more.

In certain example embodiments, the gaming table 1000 is configured to determine whether a player (e.g., player 1001) is distracted. The gaming table 1000 can determine the head position and orientation of the player 1001 based on audio input from the first player 1001. If the first player 1001's head is turned and he or she is talking (i.e., producing audio), that may indicate that he or she is distracted. Some games provided by the gaming table 1000 may require that each player participate in turn, or simultaneously (depending on the game specifics). When the gaming table 1000 determines that a player is distracted (i.e., the player's head is directed away from the gaming table 1000), the gaming table 1000 may cause the sound producer 1360 to output a distracted player audio output. The distracted player audio output may indicate to the player that it is his or her turn, that he or she must make a decision, that he or she should activate one or more controls, or that some other action should be taken. For example, if the gaming table 1000 is a blackjack table, each player may be required at a particular stage during the game to decide whether to "hit" or "stay." If it is a player's turn and he or she is distracted, it may slow down the game progress. To account for the distracted player, the gaming table 1000 may prompt the distracted player to make a decision to carry on the game play.

In certain example embodiments, the gaming table 1000 may also include a camera or other sensor, or may be associated with a camera or other sensor. The camera can be used in combination with the microphone to determine player positions, and table positions that correspond to players. Furthermore, the camera or other sensors can be used, either alone or in combination with each other and the microphone, to enable control of the gaming table by the player(s). For example, where the gaming table 1000 includes an electronic dealer rather than a human dealer, the control of the game by each player can be done using voice commands, gestures, and more.

In the example shown in FIG. 5, there are two players simultaneously playing the game. The microphone 1350 is configured to receive first gameplay audio input from the first player, and receive second gameplay audio input from the second player. The first and second gameplay audio inputs may include commands associated with the game. The gaming table 1000 may be configured to enable independent voice control by the first player based on the first gameplay audio input, and independent voice control by the second player based on the second gameplay audio input.

In certain example embodiments, the gaming table 1000 may be configured to produce an audio output that simulates a player who is not physically present at the gaming table. For example, where a single player is located at a gaming table, it may be beneficial to simulate the presence of other players. Additional simulated players can provide an improved gaming experience for the player. To accomplish this, the gaming table may simulate the presence of a second player in a table position adjacent to the player (or in some other table position), by producing sound that simulates an audio input from the second player. It may appear to the player as though a second player is in an adjacent table position based on the sound output by the gaming table. In certain embodiments, a gaming environment can include multiple gaming tables. The audio input from a first gaming table may be transmitted to a second gaming table, such that it can be output by the second gaming table. This can enable players at physically separated gaming tables to hear each other as if they are located at the same gaming table. In certain example embodiments, the gaming table may produce the audio output and direct it specifically to the ears of the player. The sound producer may be a binaural speaker array.

In certain example embodiments, the gaming table 1000 can also receive a third audio input 1383 from a bystander 1003. This is shown in FIG. 5. The gaming table 1000 can associate the third audio input 1383 with the bystander 1003, and determine a position of the bystander 1003 based on a third particle velocity associated with the third audio input 1383. The gaming table 1000 can then determine, based on the position of the bystander 1003, that the bystander 1003 is not a participant in the game. This can be done by determining that the bystander position is outside of a threshold range. In response, the gaming table 1000 can provide a third audio output to the bystander 1003. In some examples, the third audio output can indicate a suggested game for the bystander to play. The content of the third audio output may be based on a content of the third audio input 1383 from the bystander 1003. For example, where the bystander 1003 indicates an interest in playing the game currently in progress at the gaming table 1000, or indicates an interest in playing a different game, the gaming table can provide a corresponding audio output to the bystander 1003.

In certain example embodiments, the gaming table 1003 can include a display device supported by the table structure of the gaming table. The display device may replace the human dealer from a traditional gaming table. The display device may be centrally located and viewable from each table position. Alternatively or additionally, there may be one or more display devices distributed around the gaming table corresponding to each table position.

III. Casino Environment

Figure 6:
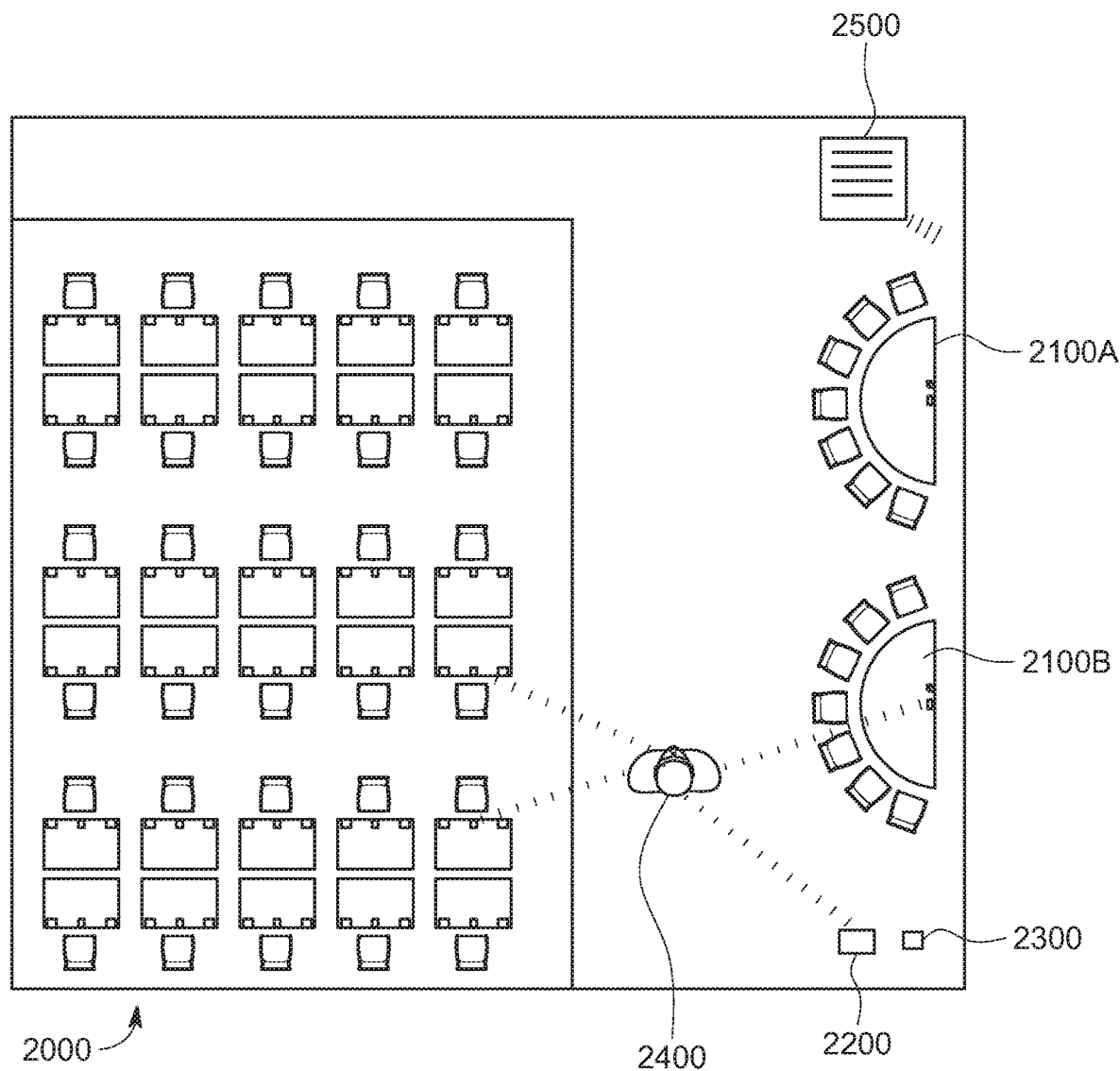
FIG. 6 is a diagrammatic top plan view of a casino environment according to one example embodiment of the present disclosure.
Figure 7:
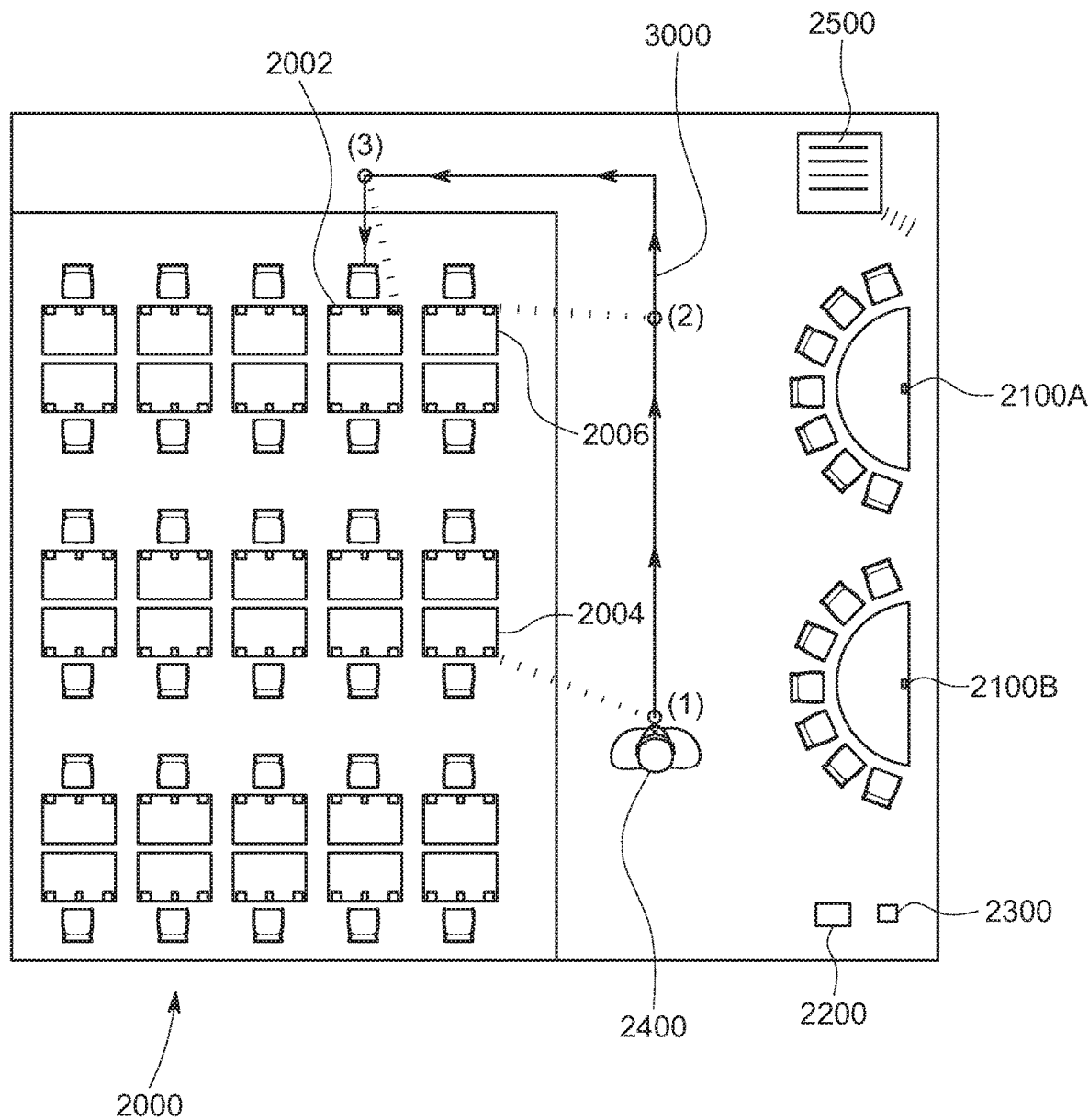
FIG. 7 is a diagrammatic top plan view of the casino environment of FIG. 6, illustrating a route for a player in the casino environment.
Figure 8:
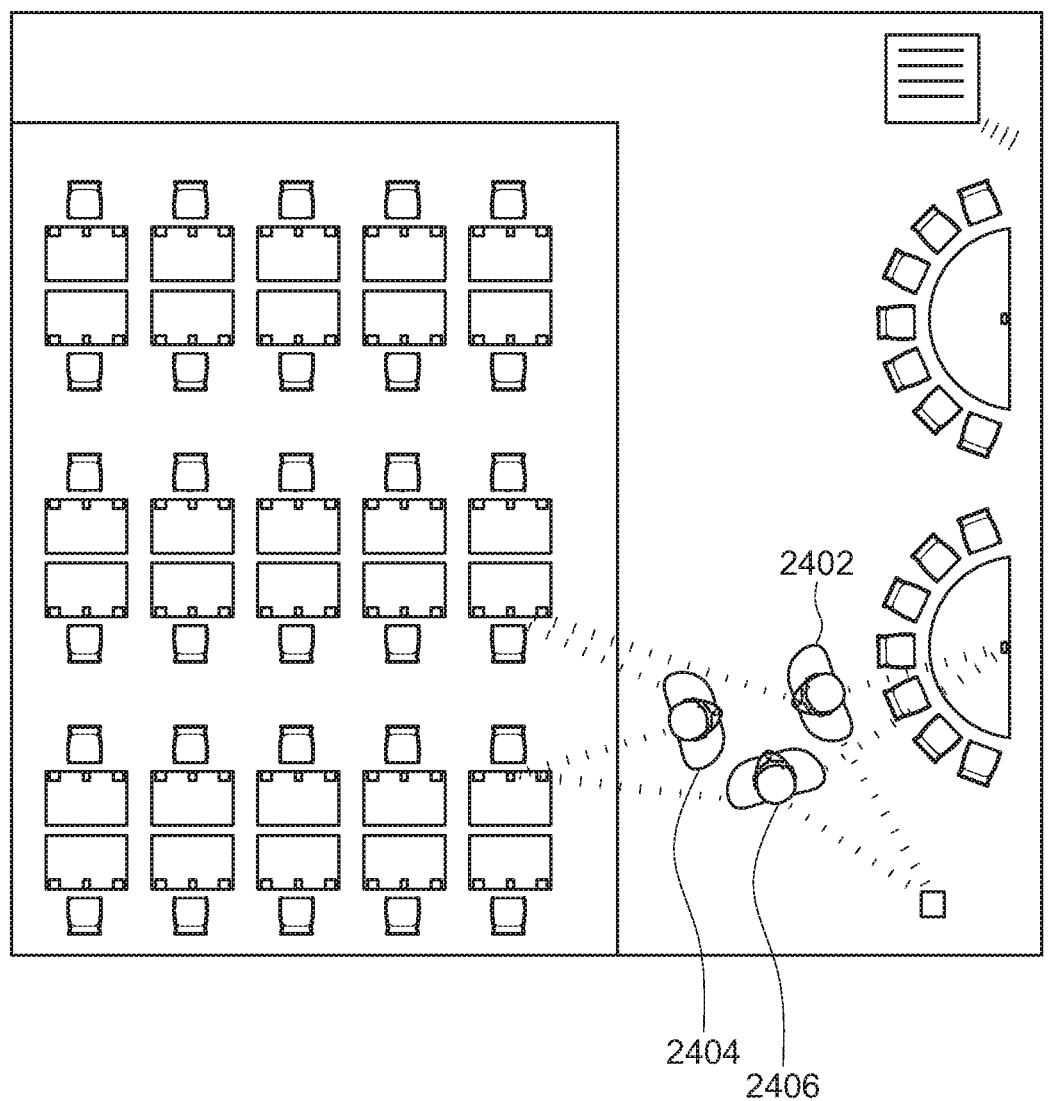
FIG. 8 is a diagrammatic top plan view of the casino environment of FIG. 6, illustrating a group of people in the casino environment.

Referring now to FIGS. 6, 7, and 8, various further example embodiments of the present disclosure are shown including a system operating in a gaming or casino environment. It should be appreciated that the present disclosure is not limited to these examples. The casino environment shown in FIGS. 6, 7, and 8 includes a plurality of EGMS 2000, first and second gaming tables 2100A and 2100B, a standalone microphone 2200, and a standalone sound producer 2300. Each of the EGMs 2000 may be similar or identical to the EGM 100 described above. Similarly, each of the gaming tables 2100A and 2100B may be similar or identical to the gaming table 1000 described above. The standalone microphone 2200 may be similar or identical to the microphones 350 and 1350 described above. However, the standalone microphone 2200 may not be attached or associated with a particular EGM or gaming table. Similarly, the sound producer 2300 may be similar or identical to the sound producer (speakers 360A and 360B) and 1360 disclosed above with respect to EGM 100 and gaming table 1000. The sound producer 2300, however, may not be attached or associated with a particular EGM or gaming table. The system operable in the casino environment shown in FIGS. 6, 7, and 8 also includes a server or computing device 2500, which is communicatively coupled to each of the EGMs 2000, gaming tables 2100A and 2100B, microphone 2200, and sound producer 2300.

FIG. 6 illustrates one example embodiment of a system operable in a casino environment. In FIG. 6, the system includes a plurality of microphones, a plurality of sound producers, a processor, and a memory. The plurality of microphones and sound producers can include microphones and sound producers integrated with one or more of the EGMs 2000, gaming tables 2100A and 2100B, and standalone microphones and sound producers 2200 and 2300. The plurality of microphones can act separately or together to receive a first audio input from a person 2400 located within the casino environment. Responsive to receiving the first audio input from the person 2400, the position of the person 2400 can be determined. The position can be determined based on the particle velocity of the first audio input. The system can then produce a first audio output to the person 2400, based on the determined position of the person 2400 within the casino environment.

In certain example embodiments, one or more actions can be triggered based on the content of the first audio input, and/or based on the determined position of the person 2400. For example, the system can produce an audio output that is personalized to the person 2400 based on the content of the audio input.

FIG. 7 illustrates a particular example embodiment wherein the player 2400 has indicated a request to play a particular game. In this example, the player 2400 has indicated that he or she has a requested gaming experience. The requested gaming experience can be any game, such as a request to find the nearest blackjack table, poker table, video poker machine, or any number of other games. In the example shown in FIG. 7, the person 2400 has asked to find the nearest of a game provided by a particular type of EGM.

In response to receiving the audio input from the person 2400, the system can determine a location of the requested gaming experience within the casino environment. In other words, the system will find the nearest EGM within the casino environment that includes the requested game. This is EGM 2002 in FIG. 7. The system then determines route between the position of the person 2400 and the EGM 2002. The system then produces audio output directed to the person 2400 that includes instructions for how to reach the requested EGM.

In certain example embodiments, the route may include multiple steps. For instance, the route 3000 shown in FIG. 7 includes a first step moving forward, and a second step moving to the left, as shown from above. At various points along the route 3000, one or more sound producers may produce audio output directed to the person 2400 with a subset of the instructions. For example, the EGM 2004 closest to the starting point of the route 3000 may provide a first instruction. The first instruction may instruct the person 2400 to walk forward to the end of the EGMs 2000. EGM 2006 may provide a second instruction to the person 2400, indicating that the person should turn left. The EGM 2006 may provide the second instruction to the person 2400 only after the person 2400 has come within a predetermined range of the EGM 2006. The target EGM 2002 that includes the requested game may then provide a third instruction to the person 2400 when the person 2400 comes within a predetermined range. The route 3000 is then complete and the person 2400 has reached the requested gaming experience.

In certain example embodiments, the instructions provided to the person 2400 may instruct the person 2400 to travel from one sound producer to another. For example, the first instruction may instruct the person 2400 to walk toward a second sound producer, which provides the second instruction. The second instruction may instruct the user to walk toward a third sound producer, which provides a third instruction. This may be repeated until the person 2400 is located at the sought after gaming experience.

In the embodiment shown in FIG. 7, the audio output instructions are all provided by the EGMs 2002, 2004, and 2006. It should be appreciated, however, that other sound producers may be used instead or in addition, such as the sound producers corresponding to the gaming tables 2100A and 2100B, and the standalone sound producer 2300.

FIG. 8 illustrates an example embodiment in which multiple people in a group are present in the casino environment. The system can receive a first audio input from a first person, and determine a location of the first person based on a particle velocity of the first person. The system can also receive a second audio input from a second person of the group, and determine a location of the second person based on a second particle velocity of the second audio input. Based on the determined locations of the first person and the second person within the casino environment, the system can provide corresponding first and second audio outputs individually to the first person and the second person.

In certain example embodiments, the system may be configured to receive a plurality of audio inputs from the plurality of persons 2402, 2404, and 2406. In response, the system may determine a quantity of persons in the group. Based on the determined quantity of persons, the system may determine an appropriate gaming experience. For example, here the quantity of persons is three. The system may determine an appropriate gaming experience for three people, and provide an audio output to one or more of the persons 2402, 2404, and 2406 with a suggested gaming experience.

In certain example embodiments, the system may cause one or more EGMs and/or gaming tables to enter an "attract mode" based on audio inputs to one or more microphones. The attract mode can include personalized greetings, different lighting or sounds, and one or more other changed characteristics from normal game play that are intended to attract players to the game.

It should be appreciated from the above that the present disclosure improves gaming technology by providing new ways to obtain player information, inputs, and positions, and to provide outputs to players based on such received or determined information, inputs, and positions.

It should also be appreciated from the above that the present disclosure improves gaming technology by providing new ways to distinguish between multiple different sound sources in a casino.

It should also be appreciated from the above that the present disclosure improves gaming technology by providing new ways to detect a quantity of users in a particular area such as a particular area of a casino.

It should also be appreciated from the above that the present disclosure improves gaming technology by providing new ways to recognize and identify players in a casino, and particularly by their voices.

IV. EGM—General Components and Operation

The EGM of the present disclosure can be controlled locally by one or more processors, and/or remotely or partially remotely by one or more remote processors, central servers, central controllers, or remote host. In various embodiments, the EGM of the present disclosure can be part of a gaming system (which is also part of the present disclosure) that includes one or more EGMs in combination with one or more remote processors, central servers, central controllers, or remote hosts. In such embodiments, the EGM is configured to communicate with the remote processors, central servers, central controllers, or remote hosts through a data network or remote communication link. In certain such embodiments, the EGM is configured to communicate with one or more other EGMs through the same data network or remote communication link or through a different data network or remote communication link.

In certain embodiments in which the gaming system includes an EGM in combination with a remote processor, central server, central controller, or remote host, the remote processor, central server, central controller, or remote host is any suitable computing device that includes at least one processor and at least one memory device or data storage device. As further described herein, the EGM includes at least one EGM processor configured to transmit and receive data or signals representing events, messages, commands, or any other suitable information between the EGM and the remote processor, central server, central controller, or remote host. The at least one processor of that EGM is configured to execute the events, messages, or commands represented by such data or signals in conjunction with the operation of the EGM. Moreover, the at least one processor of the remote processor, central server, central controller, or remote host is configured to transmit and receive data or signals representing events, messages, commands, or any other suitable information between the remote processor, central server, central controller, or remote host and the EGM. One, more than one, or each of the functions of the at least one processor of the EGM may be performed by the remote processor, the central server, the central controller, or the remote host.

In certain such embodiments, computerized instructions for controlling any games (such as any primary or base games and/or any secondary or bonus games) displayed by the EGM are executed by the remote processor, central server, central controller, or remote host. In such "thin client" embodiments, the remote processor, central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the remote processor, central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a remote processor, central server, central controller, or remote host, computerized instructions for controlling any primary or base games displayed by the EGM are communicated from the remote processor, central server, central controller, or remote host to the EGM in a thick client configuration, and computerized instructions for controlling any secondary or bonus games or other functions displayed by the EGM are executed by the remote processor, central server, central controller, or remote host in a thin client configuration.

In certain embodiments in which the gaming system includes: (a) an EGM configured to communicate with a remote processor, central server, central controller, or remote host through a data network; and/or (b) a plurality of EGMs configured to communicate with one another through a data network, the data network is a local area network (LAN) in which the EGMs are located substantially proximate to one another and/or the remote processor, central server, central controller, or remote host. In one example, the EGMs and the remote processor, central server, central controller, or remote host are located in a gaming establishment or a portion of a gaming establishment.

In other embodiments in which the gaming system includes: (a) an EGM configured to communicate with a remote processor, central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the remote processor, central server, central controller, or remote host. For example, one or more of the EGMs are located: (a) in an area of a gaming establishment different from an area of the gaming establishment in which the remote processor, central server, central controller, or remote host is located; or (b) in a gaming establishment different from the gaming establishment in which the remote processor, central server, central controller, or remote host is located. In another example, the remote processor, central server, central controller, or remote host is not located within a gaming establishment in which the EGMs are located. In certain embodiments in which the data network is a WAN, the gaming system includes a remote processor, central server, central controller, or remote host and an EGM each located in a different gaming establishment in a same geographic area, such as a same city or a same state. Gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a remote processor, central server, central controller, or remote host through a data network; and/or (b) a plurality of EGMs configured to communicate with one another through a data network, the data network is an internet (such as the Internet) or an intranet. In certain such embodiments, an Internet browser of the EGM is usable to access an Internet game page from any location where an Internet connection is available. In one such embodiment, after the EGM accesses the Internet game page, the remote processor, central server, central controller, or remote host identifies a player prior to enabling that player to place any wagers on any plays of any wagering games. In one example, the remote processor, central server, central controller, or remote host identifies the player by requiring a player account of the player to be logged into via an input of a unique username and password combination assigned to the player. The remote processor, central server, central controller, or remote host may, however, identify the player in any other suitable manner, such as: by validating a player tracking identification number associated with the player; by reading a player tracking card or other smart card inserted into a card reader (as described below); by validating a unique player identification number associated with the player by the remote processor, central server, central controller, or remote host; or by identifying the EGM, such as by identifying the MAC address or the IP address of the Internet facilitator. In various embodiments, once the remote processor, central server, central controller, or remote host identifies the player, the remote processor, central server, central controller, or remote host enables placement of one or more wagers on one or more plays of one or more primary or base games and/or one or more secondary or bonus games, and displays those plays via the Internet browser of the EGM. Examples of implementations of Internet-based gaming are further described in U.S. Pat. No. 8,764,566, entitled "Internet Remote Game Server," and U.S. Pat. No. 8,147,334, entitled "Universal Game Server."

The remote processor, central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 9:
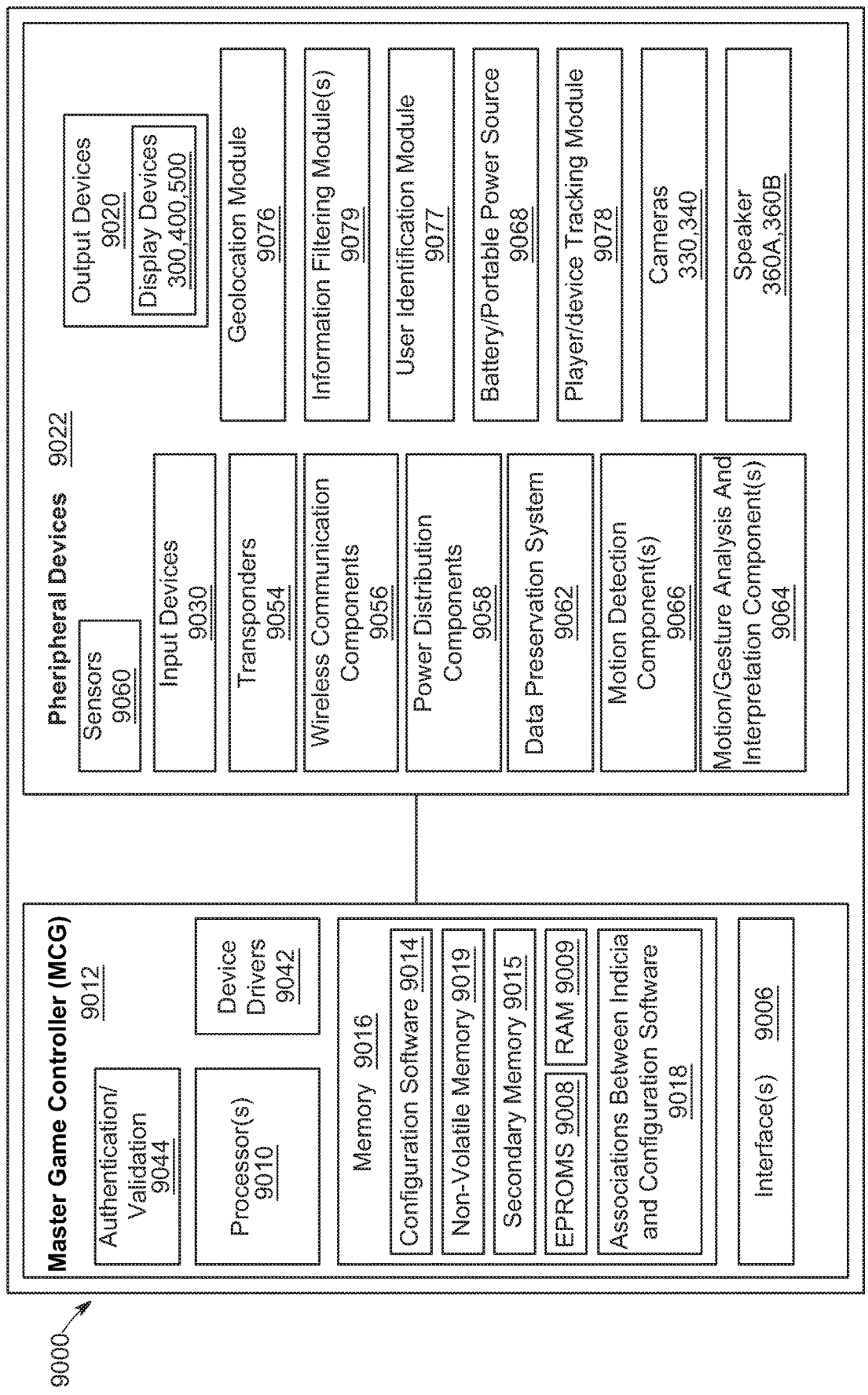
FIG. 9 is a schematic block diagram of one example embodiment of the electronic configuration of an example EGM of the present disclosure.

Referring now to FIG. 9, in various embodiments, the EGM 9000 includes a master gaming controller 9012 configured to communicate with and to operate with a plurality of peripheral devices 9022 (in addition to and including the above described devices 330, 340, 360A, 360B)). While the EGM 9000 includes components of the EGM 100 of FIGS. 1, 2A, 2B, and 3, it should be appreciated that the EGM 9000 may correspond any of the other EGMs disclosed herein. Furthermore, various features of the EGM 9000 can also be included in a gaming table, such as gaming tables 1000, 2100A, and 2100B.

The master gaming controller 9012 includes at least one processor 9010. The at least one processor 9010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 9006 of the master gaming controller 9012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 9022 (such as input/output devices); and/or (5) controlling the peripheral devices 9022. In certain embodiments, one or more components of the master gaming controller 9012 (such as the at least one processor 9010) reside within a housing of the EGM (described below), while in other embodiments at least one component of the master gaming controller 9012 resides outside of the housing of the EGM.

The master gaming controller 9012 also includes at least one memory device 9016, which includes: (1) volatile memory (e.g., RAM 9009, which can include non-volatile RAM, magnetic RAM, ferroelectric RAM, and any other suitable forms); (2) non-volatile memory 9019 (e.g., disk memory, FLASH memory, EPROMs, EEPROMs, memristor-based non-volatile solid-state memory, etc.); (3) unalterable memory (e.g., EPROMs 9008); (4) read-only memory; and/or (5) a secondary memory storage device 9015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 9016 resides within the housing of the EGM (described below), while in other embodiments at least one component of the at least one memory device 9016 resides outside of the housing of the EGM.

The at least one memory device 9016 is configured to store, for example: (1) configuration software 9014, such as all the parameters and settings for a game playable on the EGM; (2) associations 9018 between configuration indicia read from an EGM with one or more parameters and settings; (3) communication protocols configured to enable the at least one processor 9010 to communicate with the peripheral devices 9022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 9012 communicates with other devices using a serial communication protocol. A few non-limiting examples of serial communication protocols that other devices, such as peripherals (e.g., a bill validator or a ticket printer), may use to communicate with the master game controller 9012 include USB, RS-232, and Netplex (a proprietary protocol developed by IGT).

In certain embodiments, the at least one memory device 9016 is configured to store program code and instructions executable by the at least one processor of the EGM to control the EGM. The at least one memory device 9016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 9016 also stores a plurality of device drivers 9042. Examples of different types of device drivers include device drivers for EGM components and device drivers for the peripheral components 9022. Typically, the device drivers 9042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™ near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 9016 can be upgraded as needed. For instance, when the at least one memory device 9016 is a hard drive, new games, new game options, new parameters, new settings for existing parameters, new settings for new parameters, new device drivers, and new communication protocols can be uploaded to the at least one memory device 9016 from the master game controller 9012 or from some other external device. As another example, when the at least one memory device 9016 includes a CD/DVD drive including a CD/DVD configured to store game options, parameters, and settings, the software stored in the at least one memory device 9016 can be upgraded by replacing a first CD/DVD with a second CD/DVD. In yet another example, when the at least one memory device 9016 uses flash memory 9019 or EPROM 9008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In certain embodiments, the at least one memory device 9016 also stores authentication and/or validation components 9044 configured to authenticate/validate specified EGM components and/or information, such as hardware components, software components, firmware components, peripheral device components, user input device components, information received from one or more user input devices, information stored in the at least one memory device 9016, etc. Examples of various authentication and/or validation components are described in U.S. Pat. No. 6,620,047, entitled "Electronic Gaming Apparatus Having Authentication Data Sets."

In certain embodiments, in addition to the input, output and other components described in the first section above, the peripheral devices 9022 include several device interfaces, such as: (1) at least one output device 9020 including at least one display device; (2) at least one input device 9030 (which may include contact and/or non-contact interfaces); (3) at least one transponder 9054; (4) at least one wireless communication component 9056; (5) at least one wired/wireless power distribution component 9058; (6) at least one sensor 9060; (7) at least one data preservation component 9062; (8) at least one motion/gesture analysis and interpretation component 9064; (9) at least one motion detection component 9066; (10) at least one portable power source 9068; (11) at least one geolocation module 9076; (12) at least one user identification module 9077; (13) at least one player/device tracking module 9078; and (14) at least one information filtering module 9079.

The at least one output device 9020 includes at least one display device configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 100 illustrated in FIG. 1 includes a first display device 300, a player tracking display, a credit display, and a bet display.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 9020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGM 100 and illustrated in FIG. 1 may include a ticket printer and dispenser. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; and U.S. Pat. No. 6,048,269, entitled "Coinless Slot Machine System and Method."

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine."

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 9020 includes one or more sound generating devices controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGM 100 illustrated in FIG. 1 includes a plurality of speakers. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 9030 may include any suitable device that enables an input signal to be produced and received by the at least one processor 9010 of the EGM.

In one embodiment, the at least one input device 9030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGM 100 illustrated in FIG. 1 may include a combined bill and ticket acceptor and a coin slot.

In one embodiment, the at least one input device 9030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine." When the EGM is funded, the at least one processor determines the amount of funds entered and displays the corresponding amount on a credit display or any other suitable display as described below.

In certain embodiments, the at least one input device 9030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 9030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGM 100 illustrated in FIG. 1 may include a game play activation device in the form of a game play initiation button. In other embodiments, the EGM begins game play automatically upon appropriate funding rather than upon utilization of the game play activation device.

In other embodiments, the at least one input device 9030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGM 100 illustrated in FIG. 1 may include a cashout device in the form of a cashout button.

In various embodiments, the at least one input device includes a plurality of buttons that are programmable by the EGM operator to, when actuated, cause the EGM to perform particular functions. For instance, such buttons may be hard keys, programmable soft keys, or icons displayed on a display device of the EGM (described below) that are actuatable via a touch screen of the EGM (described below) or via use of a suitable input device of the EGM (such as a mouse or a joystick). The example EGM 100 illustrated in FIG. 1 may include a plurality of such buttons.

In certain embodiments, the at least one input device 9030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 9030 includes a card reader in communication with the at least one processor of the EGM. The example EGM 100 illustrated in FIG. 1 may include a card reader. The card reader is configured to read a player identification card inserted into the card reader.

The at least one wireless communication component 9056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 9056 transmits electrical, electromagnetic, or optical signals that carry digital data streams or analog signals representing various types of information.

The at least one wired/wireless power distribution component 9058 includes components or devices that are configured to provide power to other devices. For example, in one embodiment, the at least one power distribution component 9058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 9058 is configured to distribute power to one or more internal components of the EGM, such as one or more rechargeable power sources (e.g., rechargeable batteries) located at the EGM.

In certain embodiments, in addition to the components described in the first section above, the at least one sensor 9060 includes at least one of: optical sensors, pressure sensors, RF sensors, infrared sensors, image sensors, thermal sensors, and biometric sensors. The at least one sensor 9060 may be used for a variety of functions, such as: detecting movements and/or gestures of various objects within a predetermined proximity to the EGM (in addition to the detections described above); detecting the presence and/or identity of various persons (e.g., players, casino employees, etc.), devices (e.g., user input devices), and/or systems within a predetermined proximity to the EGM.

The at least one data preservation component 9062 is configured to detect or sense one or more events and/or conditions that, for example, may result in damage to the EGM and/or that may result in loss of information associated with the EGM. Additionally, the data preservation system 9062 may be operable to initiate one or more appropriate action(s) in response to the detection of such events/conditions.

In addition to the player tracker described above, the EGM of the present disclosure can also include at least one motion/gesture analysis and interpretation component 9064 configured to analyze and/or interpret information relating to detected player movements and/or gestures to determine appropriate player input information relating to the detected player movements and/or gestures. For example, in one embodiment, the at least one motion/gesture analysis and interpretation component 9064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 9068 enables the EGM 9000 to operate in a mobile environment. For example, in one embodiment, the EGM 100 includes one or more rechargeable batteries.

The at least one geolocation module 9076 is configured to acquire geolocation information from one or more remote sources and use the acquired geolocation information to determine information relating to a relative and/or absolute position of the EGM. For example, in one implementation, the at least one geolocation module 9076 is configured to receive GPS signal information for use in determining the position or location of the EGM. In another implementation, the at least one geolocation module 9076 is configured to receive multiple wireless signals from multiple remote devices (e.g., EGMs, servers, wireless access points, etc.)

and use the signal information to compute position/location information relating to the position or location of the EGM.

The at least one user identification module 9077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 9079 is configured to perform filtering (e.g., based on specified criteria) of selected information to be displayed at one or more displays of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

In certain embodiments, the EGM is a device that has obtained approval from a regulatory gaming commission, and in other embodiments, the EGM is a device that has not obtained approval from a regulatory gaming commission.

The EGMs described above are merely examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (sometimes referred to herein as "primary games") and/or any secondary or bonus games or other functions (sometimes referred to herein as "secondary games") displayed by the EGM are provided with the EGM prior to delivery to a gaming establishment or prior to being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a remote processor, central server, central controller, or remote host and a changeable EGM, the at least one memory device of the remote processor, central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the remote processor, central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the EGM randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the EGM generates the game outcome(s) and/or the award(s) to be provided based on the associated probabilities. In these embodiments, since the EGM generates game outcomes and/or awards randomly or based on one or more probability calculations, there is no certainty that the EGM will ever provide any specific game outcome and/or award.

In certain embodiments, the EGM maintains one or more predetermined pools or sets of predetermined game outcomes and/or awards. In certain such embodiments, upon generation or receipt of a game outcome and/or award request, the EGM independently selects one of the predetermined game outcomes and/or awards from the one or more pools or sets. The EGM flags or marks the selected game outcome and/or award as used. Once a game outcome or an award is flagged as used, it is prevented from further selection from its respective pool or set; that is, the EGM does not select that game outcome or award upon another game outcome and/or award request. The EGM provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game."

In certain embodiments, the EGM determines a predetermined game outcome and/or award based on the results of a bingo, keno, or lottery game. In certain such embodiments, the EGM utilizes one or more bingo, keno, or lottery games to determine the predetermined game outcome and/or award provided for a primary game and/or a secondary game. The EGM is provided or associated with a bingo card. Each bingo card consists of a matrix or array of elements, wherein each element is designated with separate indicia. After a bingo card is provided, the EGM randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern."

In certain embodiments in which the EGM is configured to communicate with the remote processor, central server, central controller, or remote host for monitoring purposes only. In such embodiments, the EGM determines the game outcome(s) and/or award(s) to be provided in any of the manners described above, and the remote processor, central server, central controller, or remote host monitors the activities and events occurring on the EGM. In one such embodiment, the EGM includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services."

As noted above, in various embodiments, the EGM includes one or more executable game programs executable by at least one processor of the EGM to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the EGM includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the EGM. In certain such embodiments, the EGM includes one or more paylines associated with the reels. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The EGM enables a wager to be placed on one or more of such paylines to activate such paylines. In other embodiments in which one or more paylines are formed between at least two adjacent symbol display areas, the EGM enables a wager to be placed on a plurality of symbol display areas, which activates those symbol display areas.

In various embodiments, the EGM provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the EGM employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations."

In various embodiments, the EGM includes a progressive award. Typically, a progressive award includes an initial amount and an additional amount funded through a portion of each wager placed to initiate a play of a primary game. When one or more triggering events occurs, the EGM provides at least a portion of the progressive award. After the EGM provides the progressive award, an amount of the progressive award is reset to the initial amount and a portion of each subsequent wager is allocated to the next progressive award. Examples of progressive gaming systems or EGMs are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards."

As generally noted above, in addition to providing winning credits or other awards for one or more plays of the primary game(s), in various embodiments the EGM provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the EGM automatically provides or initiates the secondary game upon the occurrence of a triggering event or the satisfaction of a qualifying condition. In other embodiments, the EGM initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the EGM randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the EGM determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments"; U.S. Pat. No. 8,500,548, entitled "Gaming System and Method for Providing Team Progressive Awards"; and U.S. Pat. No. 8,562,423, entitled "Method and Apparatus for Rewarding Multiple Game Players for a Single Win."

In various embodiments, the gaming system or EGM includes one or more player tracking systems. Such player tracking systems enable operators of the gaming system or EGM (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the EGM to begin a gaming session, the card reader reads the player identification number off the player tracking card to identify the player. The EGM timely tracks any suitable information or data relating to the identified player's gaming session. The EGM also timely tracks when the player tracking card is removed to conclude play for that gaming session. In another embodiment, rather than requiring insertion of a player tracking card into the card reader, the EGM utilizes one or more portable devices, such as a mobile phone, a radio frequency identification tag, or any other suitable wireless device, to track when a gaming session begins and ends. In another embodiment, the EGM utilizes any suitable biometric technology or ticket technology to track when a gaming session begins and ends.

In such embodiments, during one or more gaming sessions, the EGM tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the first display device and/or the upper display device. Examples of player tracking systems are described in U.S. Pat. No. 6,722,985, entitled "Universal Player Tracking System"; U.S. Pat. No. 6,908,387, entitled "Player Tracking Communication Mechanisms in a Gaming Machine"; U.S. Pat. No. 7,311,605, entitled "Player Tracking Assembly for Complete Patron Tracking for Both Gaming and Non-Gaming Casino Activity"; U.S. Pat. No. 7,611,411, entitled "Player Tracking Instruments Having Multiple Communication Modes"; U.S. Pat. No. 7,617,151, entitled "Alternative Player Tracking Techniques"; and U.S. Pat. No. 8,057,298, entitled "Virtual Player Tracking and Related Services."

Certain of the gaming systems described herein, including EGMs located in a casino or another gaming establishment, include certain components and/or are configured to operate in certain manners that differentiate these EGMs and systems from general purpose computing devices (i.e., certain personal gaming devices such as desktop computers and laptop computers).

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are typically not state-based machines, and a majority of data can be lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System"; U.S. Pat. No. 7,201,662, entitled "Method and Apparatus for Software Authentication"; and U.S. Pat. No. 8,627,097, entitled "System and Method Enabling Parallel Processing of Hash Functions Using Authentication Checkpoint Hashes."

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play."

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification."

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment."

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System."

It should further be appreciated that the EGM of the present disclosure may have varying or alternative housing configurations.

It should further be appreciated that the EGM of the present disclosure may have varying or alternative display device configurations.

In various embodiments, the EGM of the present disclosure is configured to be positioned on a base or stand.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electronic gaming machine comprising:
a housing;
a display device supported by the housing;
a microphone supported by the housing;
a sound producer supported by the housing;
a processor; and
a memory device that stores a plurality of instructions that, when executed by the processor, cause the processor to:
cause the display device to display a play of a game;
receive an audio input from a player via the microphone;
responsive to receiving the audio input, determine a position of the player based on a particle velocity of the audio input, said determination of the position comprising a determination of a player head orientation; and
responsive to determining that the player head orientation is directed away from the display device, cause the sound producer to output a distracted player audio output to the player to cause the player to return the player's head to a player head orientation directed toward the display device.

2. The electronic gaming machine of claim 1, wherein the plurality of instructions, when executed by the processor, cause the processor to, based on the determined position of the player, cause the sound product to output a suggestion to the player to adjust the position of the player.

3. The electronic gaming machine of claim 1, wherein the plurality of instructions, when executed by the processor, cause the processor to, based on the determined position of the player, adjust an output direction of the sound producer.

4. The electronic gaming machine of claim 1, wherein the plurality of instructions, when executed by the processor, cause the processor to:
associate the audio input with the player;
receive a second audio input from a second player via the microphone;
determine a second position of the second player based on a second particle velocity of the second audio input;
associate the second audio input with the second player; and
cause the sound producer to produce a second audio output to the second player based on the determined second position of the second player.

5. The electronic gaming machine of claim 4, wherein the game is partially controlled by two players simultaneously, and wherein the plurality of instructions, when executed by the processor, cause the processor to:
receive first gameplay audio input from the player;
receive second gameplay audio input from the second player; and
enable simultaneous independent voice control of the electronic gaming machine by (i) the player, based on the first gameplay audio input and (ii) the second player, based on the second gameplay audio input.

6. The electronic gaming machine of claim 1, wherein the plurality of instructions, when executed by the processor, cause the processor to:
associate the audio input with the player;
receive a third audio input from a bystander via the microphone;
determine a bystander position of the bystander based on a third particle velocity of the third audio input;
associate the third audio input with the bystander;
determine that the bystander is not a participant in the game; and
cause the sound producer to produce a third audio output to the bystander based on both the bystander position and the third audio input.

7. An electronic gaming table comprising:
a table structure configured to facilitate play of a game wherein players take turns in the play of the game, and comprising a plurality of different table positions;
a microphone supported by the table structure;
a sound producer supported by the table structure;
a processor; and
a memory device that stores a plurality of instructions that, when executed by the processor, cause the processor to:
receive a first audio input from a first player via the microphone;
receive a second audio input from a second player via the microphone;

responsive to receiving the first audio input and the second audio input, determine a first one of the different table positions corresponding to the first player based on a particle velocity of the first audio input, determine a second one of the different table positions corresponding to the second player based on a particle velocity of the second audio input, and determine a first player head orientation of the first player based on the particle velocity of the first audio input from the first player;

cause the sound producer to produce an audio output to either the first player or the second player based on (a) the determined first table position or the determined second table position, and (b) based on a determination of which player's turn it is; and responsive to determining that the first player head orientation is directed away from the table structure, cause the sound producer to output a distracted player audio output to the first player to cause the first player to return the first player's head to a player head orientation directed toward the table structure.

8. The electronic gaming table of claim 7, wherein the game comprises inputs from two players, and wherein the plurality of instructions, when executed by the processor, cause the processor to:

receive first gameplay audio input from the player;
receive second gameplay audio input from the second player; and
enable independent voice control of the game by (i) the player, based on the first gameplay audio input and (ii) the second player, based on the second gameplay audio input.

9. The electronic gaming table of claim 7, wherein the plurality of instructions, when executed by the processor, cause the processor to cause the sound producer to produce the audio output to either the first player or the second player such that the audio output simulates a third audio input from a third player located at a third table position adjacent to the determined first or second table position corresponding to the first or second player.

10. The electronic gaming table of claim 7, wherein the plurality of instructions, when executed by the processor, cause the processor to:

determine a second player head orientation of the second player based on the particle velocity of the second audio input from the second player; and
cause the sound producer to produce the audio output to either the first player or the second player based on the first player head orientation or the second player head orientation.

11. The electronic gaming table of claim 7, wherein the plurality of instructions, when executed by the processor, cause the processor to:

associate the first audio input with the first player and the second audio input with the second player;
receive a third audio input from a bystander via the microphone;
determine a bystander position of the bystander based on a third particle velocity of the third audio input;
associate the third audio input with the bystander;
determine that the bystander is not a participant in the game; and
cause the sound producer to produce a third audio output to the bystander based on both the determined bystander position and the third audio input.

12. The electronic gaming table of claim 7, which comprises a display device supported by the table structure, and wherein the instructions, when executed by the processor, cause the processor to cause the display device to display the play of the game.

13. A system operable in a casino environment comprising:

a plurality of microphones;
a plurality of sound producers; and
a computing device comprising:
a processor; and
a memory device that stores a plurality of instructions that, when executed by the processor, cause the processor to:
receive an audio input from a person in the casino environment via one of the plurality of microphones;
responsive to receiving the audio input, determine a position of the person within the casino environment;
determine that the audio input is associated with a requested gaming experience;
determine a location of the requested gaming experience within the casino environment;
determine a route between the position of the person within the casino environment and the location of the requested gaming experience; and
cause a first sound producer of the plurality of sound producers to produce a first route guidance instruction to the person; and
cause a second sound producer of the plurality of sound producers to produce a second route guidance instruction to the person,
wherein the first sound producer is different from the second sound producer, and wherein the first route guidance instruction indicates that the person should travel in a direction of the second sound producer.

14. The system of claim 13, wherein:

the plurality of microphones comprise a first microphone integrated with an electronic gaming machine located in the casino environment, and a second microphone integrated with an electronic gaming table located in the casino environment; and
the first sound producer is integrated with the electronic gaming machine located in the casino environment, and the second sound producer is integrated with the electronic gaming table located in the casino environment.

15. The system of claim 13, wherein the plurality of instructions, when executed by the processor, cause the processor to:

associate the audio input with the person;
receive a second audio input from a second person via one of the plurality of microphones;
determine a second position corresponding to the second person within the casino environment;
associate the second audio input with the second person; and
cause one of the plurality of sound producers to provide a second audio output to the second person based on the determined second position corresponding to the second person within the casino environment.

16. The system of claim 13, wherein the plurality of instructions, when executed by the processor, cause the processor to:

receive, via one of the plurality of microphones, a plurality of audio inputs from a plurality of persons located in the casino environment;

determine, based on the plurality of audio inputs, a quantity of persons in a group; and cause one of the plurality of sound producers to provide a group audio output to one of the plurality of persons, the audio output indicating a suggested gaming experience for the group based on the quantity of persons in the group.

17. The system of claim 13, wherein the plurality of instructions, when executed by the processor, cause the processor to:

determine the position of the person within the casino environment based on a particle velocity of the audio input.

* * * * *